United States Patent
Parchami et al.

(10) Patent No.: US 11,030,774 B2
(45) Date of Patent: Jun. 8, 2021

(54) VEHICLE OBJECT TRACKING

(71) Applicant: Ford Global Technologies, LLC, Dearborn, MI (US)

(72) Inventors: Mostafa Parchami, Dearborn, MI (US); Gintaras Vincent Puskorius, Novi, MI (US); Dinesh Palanisamy, Cary, NC (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 230 days.

(21) Appl. No.: 16/357,713

(22) Filed: Mar. 19, 2019

(65) Prior Publication Data

US 2020/0302645 A1 Sep. 24, 2020

(51) Int. Cl.
- *G06T 7/77* (2017.01)
- *G05D 1/00* (2006.01)
- *G05D 1/02* (2020.01)

(52) U.S. Cl.
CPC ............ *G06T 7/77* (2017.01); *G05D 1/0088* (2013.01); *G05D 1/0246* (2013.01); *G05D 1/0276* (2013.01); *G06T 2207/10016* (2013.01); *G06T 2207/20084* (2013.01); *G06T 2207/30232* (2013.01)

(58) Field of Classification Search
CPC .. G05D 1/0088; G05D 1/0246; G05D 1/0276; B60W 60/00; G06T 2207/10016; G06T 2207/20084; G06T 2207/30232; G06T 7/77; G06T 2207/20081; G06T 7/20; G06T 7/70

See application file for complete search history.

(56) References Cited

U.S. PATENT DOCUMENTS

| | | | |
|---|---|---|---|
| 8,328,653 B2 | 12/2012 | Lock | |
| 8,718,327 B2 | 5/2014 | Tong et al. | |
| 9,665,804 B2 | 5/2017 | Sarkis et al. | |
| 2007/0065025 A1* | 3/2007 | Paniconi | G06T 7/11 382/236 |
| 2015/0117704 A1* | 4/2015 | Bulan | G06T 7/20 382/103 |
| 2018/0039853 A1* | 2/2018 | Liu | G06K 9/72 |
| 2019/0011275 A1* | 1/2019 | Whinston | G08G 1/096816 |
| 2019/0340782 A1* | 11/2019 | Sinha | G06K 9/6202 |

FOREIGN PATENT DOCUMENTS

| | | |
|---|---|---|
| CN | 102592112 B | 1/2014 |
| CN | 103077531 B | 11/2015 |
| CN | 108230367 A | 6/2018 |

OTHER PUBLICATIONS

Kangin, Dmitry, Intelligent Video Surveillance, Feb. 2016, Lancaster University (Year: 2016).*

\* cited by examiner

*Primary Examiner* — Hunter B Lonsberry
*Assistant Examiner* — Matthew J. Reda
(74) *Attorney, Agent, or Firm* — Frank A. MacKenzie; Bejin Bieneman PLC (57) ABSTRACT

A system, comprising a computer that includes a processor and a memory, the memory storing instructions executable by the processor to determine an object location prediction based on a video data stream, wherein the object location prediction is based on processing cropped TEDA data with a neural network. The processor can be further programmed to download the object location prediction to a vehicle based on a location of the vehicle.

20 Claims, 7 Drawing Sheets

VEHICLE OBJECT TRACKING

BACKGROUND

Vehicles can be equipped to operate in both autonomous and occupant piloted mode. By a semi- or fully-autonomous mode, we mean a mode of operation wherein a vehicle can be piloted partly or entirely by a computing device as part of a vehicle information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

A computing device in a vehicle can be programmed to acquire sensor data regarding the external environment of a vehicle and to use the sensor data to determine a vehicle path upon which to operate a vehicle in autonomous or semi-autonomous mode. A vehicle path is a straight or curved line that describes successive locations (i.e., locations at different times) of a vehicle on a two-dimensional (2D) plane parallel to the surface of a roadway upon which the vehicle operates. Based on a vehicle path, a computing device can direct vehicle powertrain, steering and braking components to operate a vehicle on a roadway. A traffic control system can track objects based on video data acquired by stationary video cameras and download tracked object information including a location in global coordinates to a vehicle, based on a location of the vehicle in global coordinates. The vehicle can operate on a vehicle path based on the downloaded tracked object information.

Disclosed herein is a method, including determining an object location prediction based on a video stream data, wherein the object location prediction is based on processing cropped typicality and eccentricity data analytics (TEDA) data with a neural network and providing the object location prediction to a vehicle based on a location of the vehicle. TEDA data can be determined by processing the video stream data to determine an eccentricity image based on a per pixel average and a per pixel variance over a moving window of k video frames, wherein k is a small number. TEDA data can be determined by determining a three-channel output image including a grayscale image, a positive eccentricity $e^+$ image, and negative eccentricity $e^-$ image. The TEDA data can be cropped based on the object location prediction, wherein an initial object location prediction is determined based processing a frame of video stream data with a neural network and determining a minimal enclosing rectangle. The cropped TEDA data can be processed with a convolutional neural network to determine the object location prediction.

A first object location prediction can be concatenated with intermediate results, or, at subsequent iterations, an object location prediction output at a previous iteration and processed with a fully-connected neural network to determine the object location prediction. The object location prediction can be based on global coordinates. The object location prediction can be provided based on global coordinates corresponding to the location of the vehicle. The video stream data can be acquired by a stationary video camera included in a traffic infrastructure system that includes a computing device to communicate with the vehicle via a wireless network. The neural network can be trained based on recorded video stream data and recorded ground truth object location information. The ground truth object location information can be determined based on global coordinates. Operating the vehicle can be based on the object location prediction. The vehicle can be operated based on the object location prediction includes determining a vehicle path and combining the object location prediction with the vehicle path. Operating the vehicle can be based on the location prediction includes controlling one or more of vehicle powertrain, brakes and steering.

Further disclosed is a computer readable medium, storing program instructions for executing some or all of the above method steps. Further disclosed is a computer programmed for executing some or all of the above method steps, including a computer apparatus, programmed to determine an object location prediction based on a video stream data, wherein the object location prediction is based on processing cropped typicality and eccentricity data analytics (TEDA) data with a neural network and providing the object location prediction to a vehicle based on a location of the vehicle. TEDA data can be determined by processing the video stream data to determine an eccentricity image based on a per pixel average and a per pixel variance over a moving window of k video frames, wherein k is a small number. TEDA data can be determined by determining a three-channel output image including a grayscale image, a positive eccentricity $e^+$ image, and negative eccentricity $e^-$ image. The TEDA data can be cropped based on the object location prediction, wherein an initial object location prediction is determined based processing a frame of video stream data with a neural network and determining a minimal enclosing rectangle. The cropped TEDA data can be processed with a convolutional neural network to determine the object location prediction.

The computer apparatus can be further programmed to concatenate an object location prediction with intermediate results, or, at subsequent iterations, an object location prediction output at a previous iteration and processed with a fully-connected neural network to determine the object location prediction. The object location prediction can be based on global coordinates. The object location prediction can be provided based on global coordinates corresponding to the location of the vehicle. The video stream data can be acquired by a stationary video camera included in a traffic infrastructure system that includes a computing device to communicate with the vehicle via a wireless network. The neural network can be trained based on recorded video stream data and recorded ground truth object location information. The ground truth object location information can be determined based on global coordinates. Operating the vehicle ca be based on the object location prediction. The vehicle can be operated based on the object location prediction includes determining a vehicle path and combining the object location prediction with the vehicle path. Operating the vehicle can be based on the location prediction includes controlling one or more of vehicle powertrain, brakes and steering.

Figure 1:
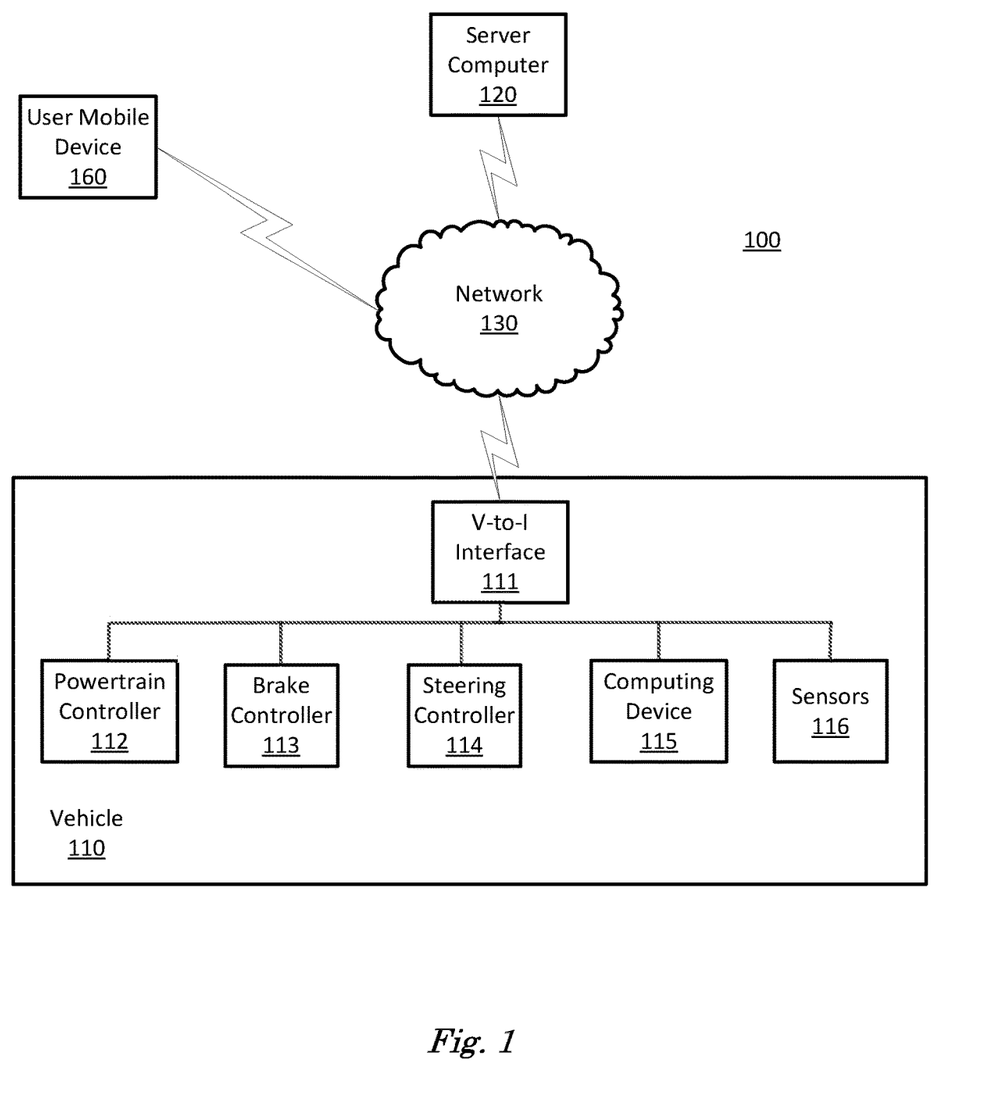
FIG. 1 is a block diagram of an example traffic infrastructure system.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. Vehicle 110 also includes one or more computing devices 115 for processing data for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
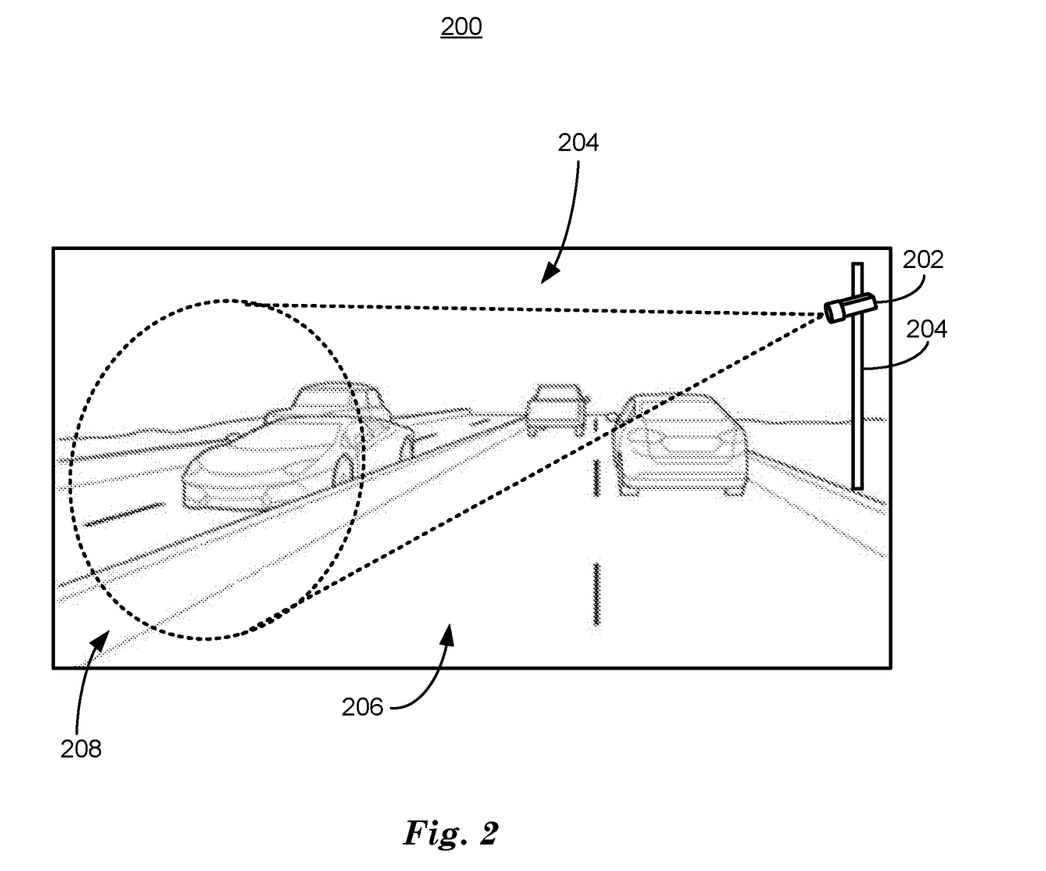
FIG. 2 is a diagram of an example traffic scene including a stationary video camera.

FIG. 2 is a diagram of a traffic scene 200, which includes a stationary video camera 202 mounted on a pole 204. Stationary (i.e., not moving from place to place and having an unmoving field of view 208) video camera 202 can be mounted on a pole 204, a building, or other structure to provide stationary camera 202 with a view of a roadway 206. Stationary video camera 202 can have a view of roadway 206 when camera field of view 208 (dotted line) intersects r, and, from time to time, one or more vehicles 204. Stationary video camera 202 can be in communication with a traffic information system 100 as discussed above in relation to FIG. 1. Traffic information system 100 can include a server computer 120 that can acquire time series stationary video data to input to a typicality and eccentricity data analytics neural network to determine a moving object location prediction based on the input stationary video data, where a moving object location prediction includes an object location in global coordinates. The object location can be measured in meters based on x, y coordinates defined in a two-dimensional x, y plane parallel to roadway 206. The x, y coordinates location and orientation can be based on global coordinates such as latitude and longitude in a Global Positioning System (GPS) or the like, for example.

Server computer 120 can determine a location in global coordinates for a vehicle 110. Server computer 120 can be an edge computing device. Edge computing devices are computing devices that are on the "edge" of a traffic infrastructure system, meaning that they are located geographically close to a roadway where autonomous vehicles are operating. In this fashion edge computing devices can perform processing near geographical locations where the processed data will be used, thereby maintaining low latency or delay in communications. Server computer 120 can, for example, initiate communications with a vehicle 110 upon receipt of network 130 communications from another server computer 120 in communications with vehicle 110, similar to cellular telephone towers handing off telephone conversations, for example. Server computer 120 can also detect vehicle 110 based on receiving Wi-Fi signals when vehicle 110 travels into Wi-Fi range, for example. Based on establishing communications, server computer 120 can receive location information from vehicle 110 based on vehicle sensors 116, including GPS and inertial measurement unit (IMU). Vehicle location information can be in global coordinates and can include vehicle location and vehicle velocity.

Server computer 120 can combine predicted moving object location information with vehicle location information to determine if vehicle 110 should be interested in predicted moving object location by determining if predicted paths for the object and the vehicle 110 would locate the object and the vehicle 110 closer than a user input threshold, for example 100 meters. When the predicted paths are closer than the threshold, server computer 120 can communicate object location and object velocity to vehicle 110 to permit vehicle 110 to include the predicted moving object location information in determining a vehicle path upon which to operate on a roadway 206.

Figure 3:
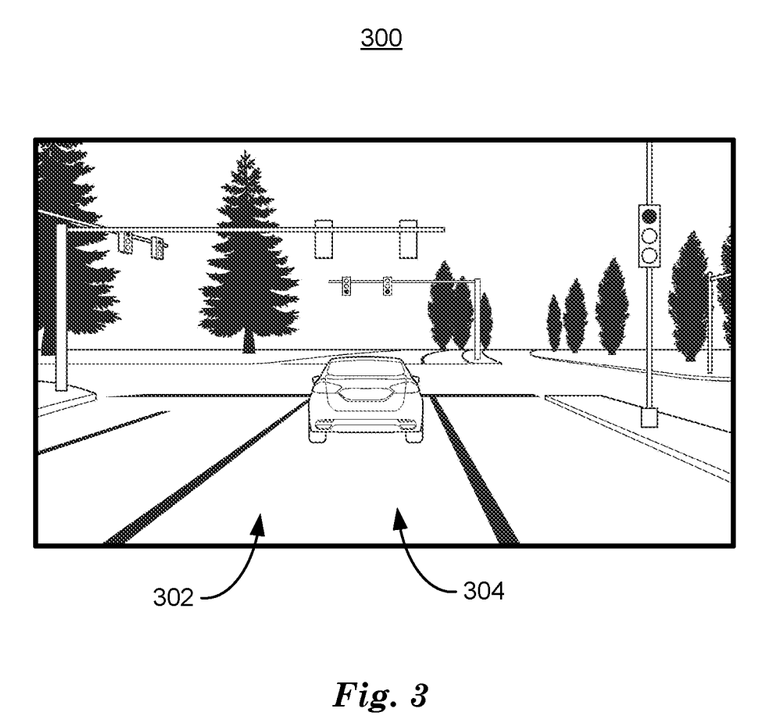
FIG. 3 is a diagram of an example video image of a traffic scene.

FIG. 3 is a diagram of an example video image 300 acquired by a stationary video camera 202. Video image 300 is a black and white rendering of a color, greyscale, or infrared (IR) video image, for example. Video image 300 includes a roadway 302 and a vehicle 304 operating on the roadway 302. A computing device, for example server computer 120 included in a traffic information system 100, can input a stream or time series of video images 300 acquired by a stationary video camera 202, and, using techniques described herein, track a moving object in the input video data stream by determining tracking information including an object location and an object velocity corresponding to the tracked object and downloading the tracking information to a vehicle 110. Tracking a moving object by determining an object location and an object velocity permits predicting or estimating a future location for the moving object.

Objects can be tracked in a video data stream by first applying typicality and eccentricity analytics (TEDA) to a video data stream to determine an eccentricity e image. An eccentricity e image is based on a per pixel average and a per pixel variance of a kth video frame in a stream of video frames. The eccentricity e image can be processed to form a cropped, three-channel TEDA image. The cropped, three-channel TEDA image, along with cropping information, can be input to a TEDA neural network to determine object location predictions and thereby track objects.

Figure 4:
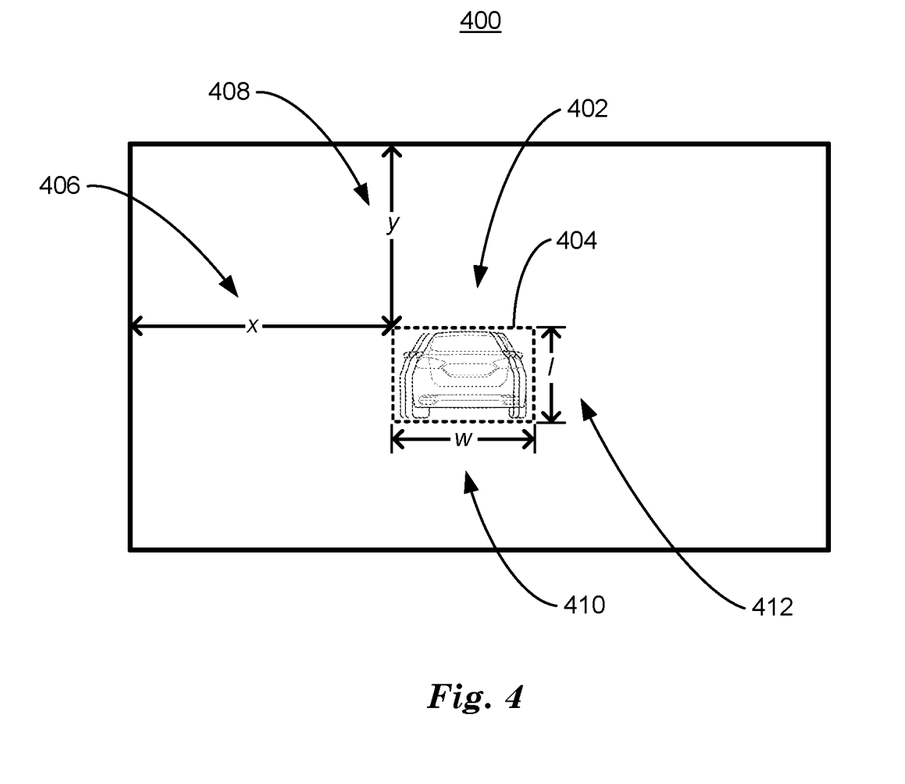
FIG. 4 is a diagram of an example processed video image of a traffic scene.

FIG. 4 is a diagram of a three-channel TEDA image 400, rendered in black and white. Three-channel TEDA image 400 is output resulting from processing an input stream of video data with a TEDA process. A TEDA process performs a finite memory, recursive, eccentricity calculation in input time series video data. Assume xk is a pixel in a frame k of video stream data, a three-channel TEDA image can be determined according to the following equations:

$$\mu_k = (1-\alpha)\mu_{k-1} + \alpha x_k \quad (1)$$

$$d_k^2 = (x_k - \mu_k)^T(x_k - \mu_k) \quad (2)$$

$$\sigma_k^2 = (1-\alpha)\sigma_{k-1}^2 + \frac{\alpha}{1-\alpha}d_k^2 \quad (3)$$

$$\varepsilon_k = \alpha\left(1 + \frac{d_k^2}{\max(\sigma_k^2, \gamma)}\right) + \frac{\alpha}{1-\alpha}d_k^2 \quad (4)$$

$$\varepsilon_k^* = \left(\frac{\varepsilon_k - \alpha}{1-\alpha}\right) \quad (5)$$

$$\varepsilon_k^+ = \begin{cases} 0, & \|x_k\|^2 < \|\mu_k\|^2 \\ \varepsilon_k^*, & \|x_k\|^2 \geq \|\mu_k\|^2 \end{cases} \quad (6)$$

$$\varepsilon_k^- = \begin{cases} 0, & \|x_k\|^2 \geq \|\mu_k\|^2 \\ \varepsilon_k^*, & \|x_k\|^2 < \|\mu_k\|^2 \end{cases} \quad (7)$$

Where $\mu_k$ is the per-pixel mean of the kth video frame, $\sigma_k^2$ is the per-pixel variance for the same kth video frame, $\varepsilon_k$ is the per-pixel eccentricity image and $\alpha$ is a user input learning constant and can be about 0.01. $\varepsilon_k^+$ and $\varepsilon_k^-$ form positive and negative eccentricity images or channels. The normalized eccentricity image $\varepsilon_k^*$ can be used as a mask to form a greyscale image or channel corresponding to a moving object in the input video stream data. The greyscale channel, the $\varepsilon_k^+$ channel and the $\varepsilon_k^-$ channel can be combined to form a three-channel TEDA image 400 with non-zero pixels corresponding to a tracked object 402 and background pixels equal to zero. A TEDA process can be performed on input video stream data 502 by a TEDA processor 504 as described below in relation to FIG. 5.

Three-channel TEDA image 400 can include a contiguous region of pixels with non-zero values corresponding to a tracked object 402 and pixels with value zero corresponding to background or non-moving objects. The contiguous region of pixels corresponding to tracked object 402 can be cropped from the input image by first determining a minimal enclosing rectangle 404 to include all of the tracked object 402 pixels while including a minimal number of background pixels and then deleting all pixels not enclosed by the rectangle. A minimal enclosing rectangle 404 can defined by its x, y address (i.e., pixel coordinates) 406, 408, w width 410, and l length 412, in pixels, as a first estimate of the location of the tracked object 402 $T_1 = (x_1, y_1, w_1, l_1)$. A three-channel TEDA image 400 can be cropped in this fashion by a crop processor 508, described in relation to FIG. 5, below.

Figure 5:
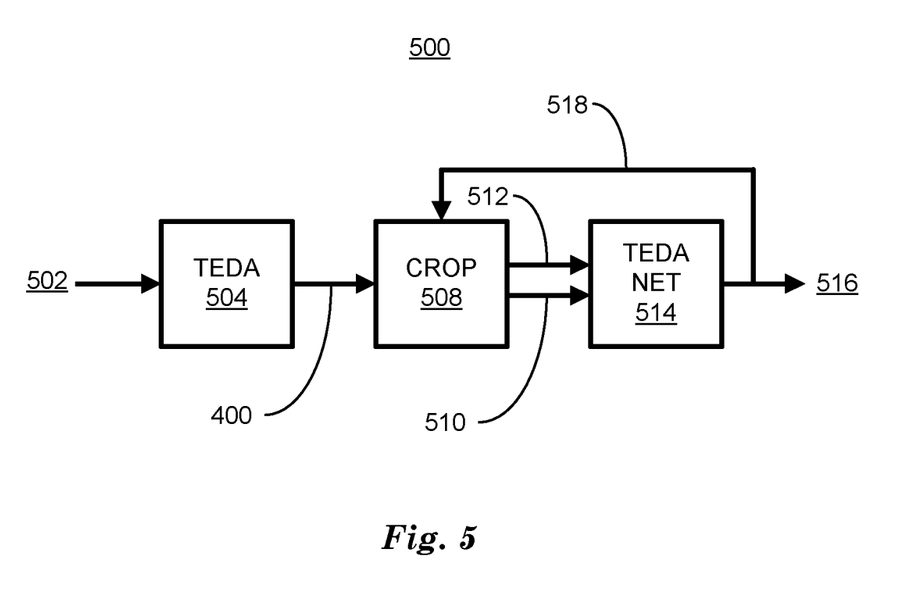
FIG. 5 is a diagram of an example object tracking processor.

FIG. 5 is a diagram of a TEDA tracking system 500. TEDA tracking system 500 inputs video stream data 502 $\Phi_k$ and predicts a position of a tracked object 402 $T_t^*$ within the next $(t+1)^{th}$ video frame:

$$\hat{T}_{t+1}^* = f(T_t^*) \quad (8)$$

Where $\hat{T}_{t+1}^*$ is the predicted position of the tracked object 402 in the $(t+1)^{th}$ video frame. The number of frames predicted can be extended K frames into the future by iterating. In subsequent iterations, the input predicted position can be the output predicted object location from the previous iteration. TEDAS tracking system 500 outputs tracked object predictions 516 $\hat{T}_{t+1}^* \ldots \hat{T}_{t+1+K}^*$ including predicted locations of a tracked object 402. TEDA tracking system 500 includes a TEDA processor 504 (TEDA) that inputs video stream data 502 $\Phi_k$ and outputs three-channel TEDA images 400 including foreground and background pixels according to equations (1)-(7), above. If the three-channel TEDA image 400 includes a tracked object 402 as discussed above in relation to FIG. 4, TEDA processor 504 outputs the three-channel TEDA image 400 to crop processor 508 (CROP).

Crop processor 508 crops TEDA image 400 as described above in relation to FIG. 4 to create a rectangular cropped image 512 that includes a tracked object 402. Crop processor 508 outputs the cropped image 512 and cropped image information 510 including location and size $T_t^* = (x_t^*, y_t^*, w_t^*, l_t^*)$ to TEDA net 514. TEDA net 514 is a neural network that inputs a cropped image data 512 and crop image information 510 and outputs tracked object predictions 516:

$$\hat{T}_{t+1}^* = <x_t^* + \hat{dx}_t^*, y_t^* + \hat{dy}_t^*, w_t^* + \hat{dw}_t^*, l_t^* + \hat{dl}_t^*> \quad (9)$$

$$\hat{T}_{t+1+K}^* = <x_t^* + \hat{dx}_{t+K}^*, y_t^* + \hat{dy}_{t+K}^*, w_t^* + \hat{dw}_{t+K}^*, l_t^* + \hat{dl}_{t+K}^*> \quad (10)$$

Where $\hat{T}_{t+1}^* \ldots \hat{T}_{t+1+K}^*$ denotes predictions for a location of a tracked object 402 from 1 through K frames into the future. The tracked object predictions 516 are feedback 518 to crop processor 508 to use in cropping the next input three-channel TEDA image 400.

Figure 6:
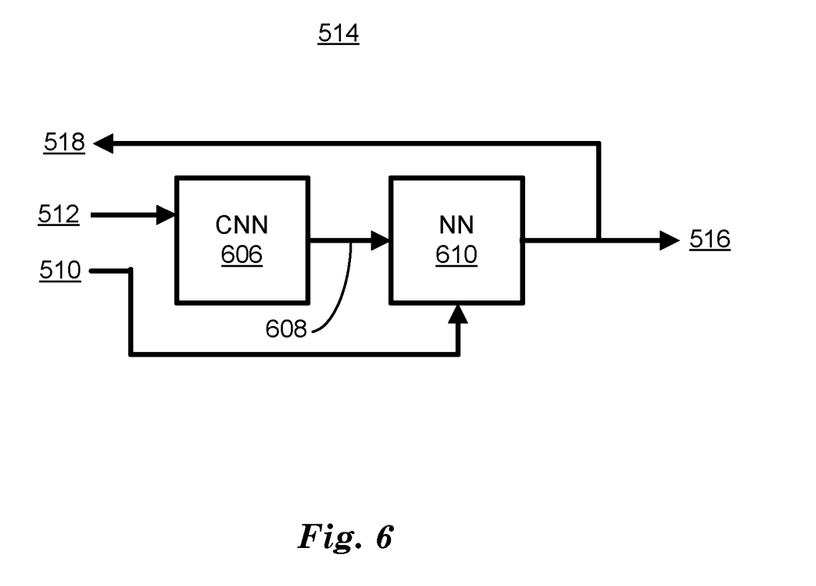
FIG. 6 is a diagram of an example typicality and eccentricity data analytics neural network.

FIG. 6 is a diagram of an example typicality and eccentricity data analytics neural network (TEDA net) 514 from FIG. 5. TEDA net 514 includes a convolutional neural network 606 (CNN) and a fully-connected neural network 610 (NN). The convolutional neural network 606 includes a plurality of convolutional layers and a plurality of pooling layers that create intermediate results 608 that are concatenated with crop image information 510 and input to fully-connected neural network 606. For example, crop information can include the (x, y) location and bounding box size (width, height) with respect to the current image. Convolutional neural network 606 can be implemented using SqueezeNet (DeepScale, Mountain View, Calif. 94043) a deep neural network based on the Caffe neural network architecture (Berkeley Artificial Intelligence Research, University of California Berkeley, Berkeley, Calif. 94704). Fully-connected neural network can be configured to determine output tracked object predictions 516 $\hat{T}_{t+1}^* \ldots \hat{T}_{t+1+K}^*$ by training the TEDA net 514 using ground truth data from vehicles imaged as tracked objects.

Ground truth data is information on tracked object locations obtained independently from TEDA net 514 processing. In examples location information in global coordinates can be obtained from GPS and inertial measurement units (IMUs) included in vehicles and recorded by manual or automatic sequence annotation of corresponding video camera data as they pass through the field of view 208 of a stationary video camera 202. The location data can be processed to project global coordinate locations into pixel location on a video image sensor of stationary video camera 202. The ground truth data is then used to compare to output tracked object predictions 516 $\hat{T}_{t+1}^* \ldots \hat{T}_{t+1+K}^*$ to form backpropagated reward functions that train TEDA net to output accurate tracked object predictions 516 $\hat{T}_{t+1}^*$ ... $\hat{T}_{t+1+K}^*$.

Figure 7:
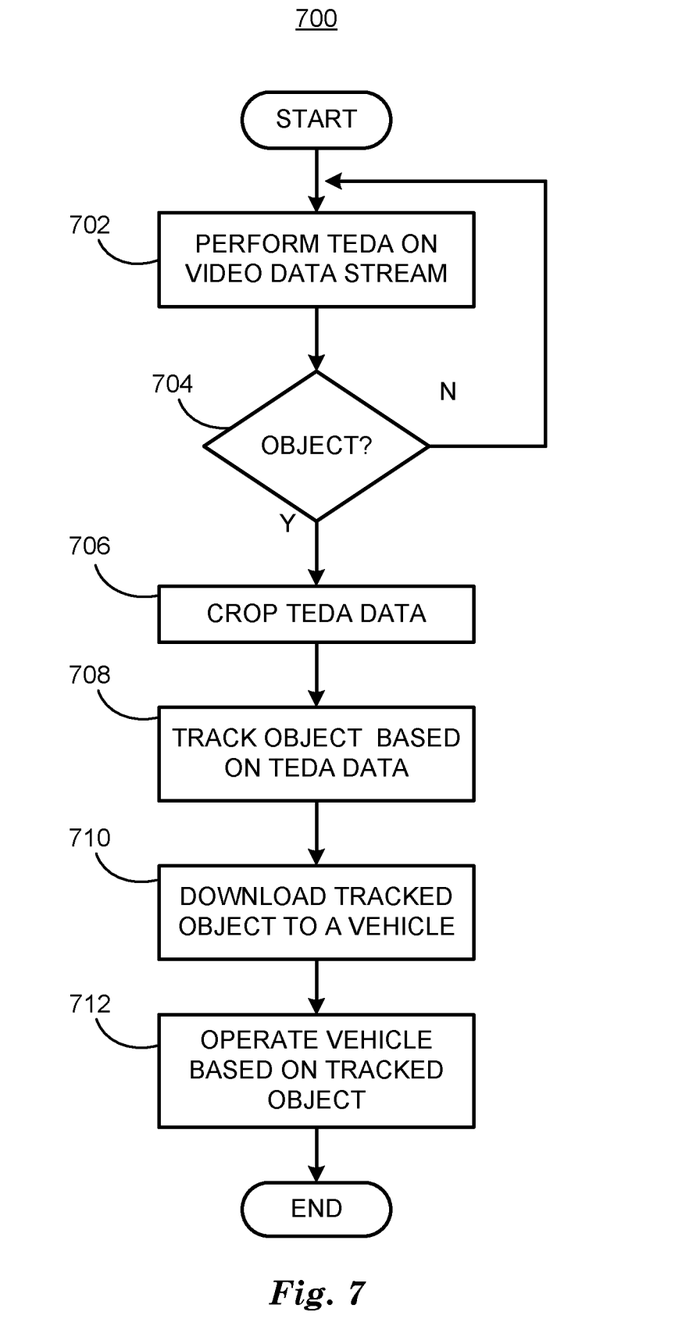
FIG. 7 is a flowchart diagram of a process to determine and download tracked objects.

FIG. 7 is a diagram of a flowchart, described in relation to FIGS. 1-6, of a process 700 for tracking an object and downloading the tracked object information to a vehicle 110 based on vehicle location. Process 700 can be implemented by a processor of computing device 115, taking as input information from sensors 116, and executing commands and sending control signals via controllers 112, 113, 114, for example. Process 700 includes multiple blocks taken in the disclosed order. Process 700 could alternatively or additionally include fewer blocks or can include the blocks taken in different orders.

Process 700 begins at block 702, where a frame of video data from a video data stream 502 $\Phi_k$ acquired from a stationary video camera 202 is input to a TEDA tracking system 500. The frame of video data can be processed to determine a bounding rectangle corresponding to an object. The object can be detected based on one or more deep learning techniques including YOLO, an object recognition deep learning framework available at https://github.com/pjreddie/darknet, Feb. 4, 20019, and Faster R-CNN, an object recognition deep learning framework available at https://github.com/rbgirshick/py-faster-rcnn, Feb. 4, 2019.

At block 704, an output image from the object detection process at block 702 is tested to determine if the output image includes a rectangle corresponding to an object. If the output image does not include a rectangle corresponding to an object, process 700 returns to block 702 to acquire and process another frame of video data. If the output image includes a rectangle corresponding to an object, a three-channel TEDA image 400 can be determined by determining according to equations (1)-(7) and TEDA process 504 from FIG. 5, above, and combined with image data included in the determined rectangle to form a three-channel TEDA image 400. When the output image includes a rectangle corresponding to an object, process 700 passes to block 706.

At block 706, the three-channel TEDA image is cropped according to crop process 508 from FIG. 5 Crop process 508 can crop the three-channel TEDA image based in input crop information from block 704 or based on a previous frame according to feedback 518 from output tracked object predictions 516 $\hat{T}_{t+1}^*$ ... $\hat{T}_{t+1+K}^*$. Crop process 508 outputs a cropped image 512 and cropped image information 510 to TEDA neural network 514.

At block 708 TEDA neural network 514 processes input cropped image 512 and cropped image information 510 to produce tracked object predictions 516 $\hat{T}_{t+1}^*$ ... $\hat{T}_{t+1+K}^*$. Tracked object predictions 516 $\hat{T}_{t+1}^*$ ... $\hat{T}_{t+1+K}^*$ are based on pixel coordinates. Using information regarding the location and orientation of field of view 208 in global coordinates, information on the location of a roadway 206 in global coordinates and a magnification of a lens included in stationary video camera 202, tracked object predictions 516 $\hat{T}_{t+1}^*$ ... $\hat{T}_{t+1+K}^*$ can be transformed into global coordinates. By intersecting a 2D plane corresponding to a roadway 206 with the field of view 208, locations measured in pixels with respect to a video image can be orthographically projected onto the plane and measured in global coordinates corresponding to locations on the roadway 206. In this fashion tracked object predictions 516 output from TEDA tracking system 500 can be transformed into global coordinates.

At block 710 a traffic information system can determine a location of a vehicle 110 in global coordinates as described above in relation to FIG. 2 and download the tracked object predictions 516 $\hat{T}_{t+1}^*$ ... $\hat{T}_{t+1+K}^*$ transformed into global coordinates based on a distance measure between the vehicle location and the tracked object predictions 516 $\hat{T}_{t+1}^*$ ... $\hat{T}_{t+1+K}^*$ as discussed above in relation to FIG. 2.

At block 712 a computing device in vehicle 110 can include the tracked object predictions 516 $\hat{T}_{t+1}^*$ ... $\hat{T}_{t+1+K}^*$ in a process to determine a vehicle path for operating vehicle 110 on a roadway 206. A computing device 115 can determine a vehicle path that can be used to predict vehicle locations for vehicle 110 at a future time $\hat{T}_{t+1+K}^*$. A future position of a vehicle 110 can be compared to a position of a vehicle corresponding to the tracked object prediction at time $\hat{T}_{t+1+K}^*$, for example, to determine if a collision or near-collision will occur in the future. Computing device 115 can alter the vehicle path and control one or more of vehicle powertrain, brakes, and steering to avoid a future collision or near-collision, thereby improving operation of vehicle 110. Following block 712 process 700 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining an object location prediction based on a video stream data, wherein the object location prediction is based on processing cropped typicality and eccentricity data analytics (TEDA) data with a neural network by determining a first eccentricity image based on a per pixel average and a per pixel variance over a moving window of k video frames;
   cropping the TEDA data based on a three-channel output image including a grayscale image, a positive eccentricity image determined by selecting pixels from the first eccentricity image when the pixels are greater than a per-pixel mean, and a negative eccentricity image determined by selecting pixels from the first eccentricity image when the pixels are less than the per-pixel mean; and
   providing the object location prediction to a vehicle based on a location of the vehicle.

2. The method of claim 1, further comprising determining TEDA data by processing the video stream data to determine an eccentricity image based on a per pixel average and a per pixel variance over a moving window of k video frames, wherein k is a small number.

3. The method of claim 2, further comprising determining TEDA data by determining a three-channel output image including a grayscale image, a positive eccentricity $e^+$ image determined by selecting pixels from the first eccentricity image when the squares of the absolute value of the pixels are greater than the squares of the absolute value of the per-pixel mean, and negative eccentricity $e^-$ image determined by selecting pixels from the first eccentricity image when the squares of the absolute value of the pixels are less than the squares of the absolute value of the per-pixel mean.

4. The method of claim 1, further comprising cropping the TEDA data based on the object location prediction, wherein an initial object location prediction is determined based on processing a frame of video stream data with the neural network and determining a minimal enclosing rectangle.

5. The method of claim 4, wherein the cropped TEDA data is processed with a convolutional neural network to determine the object location prediction.

6. The method of claim 5, wherein a first object location prediction is concatenated with intermediate results, or, at subsequent iterations, an object location prediction output at a previous iteration and processed with a fully-connected neural network to determine the object location prediction.

7. The method of claim 1, further comprising determining the object location prediction based on global coordinates.

8. The method of claim 1, further comprising providing the object location prediction based on global coordinates corresponding to the location of the vehicle.

9. The method of claim 1, wherein the video stream data is acquired by a stationary video camera included in a traffic infrastructure system that includes a computing device to communicate with the vehicle via a wireless network.

10. A system, comprising a processor; and
    a memory, the memory including instructions to be executed by the processor to:
       determine an object location prediction based on a video stream data, wherein the object location prediction is based on processing cropped typicality and eccentricity data analytics (TEDA) data with a neural network by determining a first eccentricity image based on a per pixel average and a per pixel variance over a moving window of k video frames;
       crop the TEDA data based on a three-channel output image including a grayscale image, a positive eccentricity image determined by selecting pixels from the first eccentricity image when the pixels are greater than a per-pixel mean, and a negative eccentricity image determined by selecting pixels from the first eccentricity image when the pixels are less than the per-pixel mean; and
       provide the object location prediction to a vehicle based on a location of the vehicle.

11. The system of claim 10, wherein the instructions further include instructions to determine TEDA data by processing the video stream data to determine an eccentricity e image based on a per pixel average and a per pixel variance over a moving window of k video frames, wherein k is a small number.

12. The system of claim 11, wherein the instructions further include instructions to determine TEDA data by determining a three-channel output image including a grayscale image, a positive eccentricity $e^+$ image determined by selecting pixels from the first eccentricity image when the squares of the absolute value of the pixels are greater than the squares of the absolute value of the per-pixel mean, and negative eccentricity $e^-$ image determined by selecting pixels from the first eccentricity image when the squares of the absolute value of the pixels are less than the squares of the absolute value of the per-pixel mean.

13. The system of claim 10, wherein the instructions further include instructions to crop the TEDA data based on the object location prediction, wherein an initial object location prediction is determined based on processing a frame of video stream data with the neural network and determining a minimal enclosing rectangle.

14. The system of claim 13, wherein the instructions further include instructions to process the cropped TEDA data with a convolutional neural network to determine the object location prediction.

15. The system of claim 14, wherein the instructions further include instructions to concatenate a first object location prediction with intermediate results, or, at subsequent iterations, an object location prediction output at a previous iteration and processed with a fully-connected neural network to determine the object location prediction.

16. The system of claim 10, wherein the instructions further include instructions to determine the object location prediction based on global coordinates.

17. The system of claim 16, wherein the instructions further include instructions to provide the object location prediction based on global coordinates corresponding to the location of the vehicle.

18. The system of claim 17, wherein the video stream data is acquired by a stationary video camera included in a traffic infrastructure system that communicates with the vehicle via a wireless network.

19. A system, comprising:
means for controlling vehicle steering, braking and powertrain; and
means for:
determining an object location prediction based on a video stream data, wherein the object location prediction is based on processing cropped typicality and eccentricity data analytics (TEDA) data with a neural network by determining a first eccentricity image based on a per pixel average and a per pixel variance over a moving window of k video frames;

cropping the TEDA data based on a three-channel output image including a grayscale image, a positive eccentricity image determined by selecting pixels from the first eccentricity image when the pixels are greater than a per-pixel mean, and a negative eccentricity image determined by selecting pixels from the first eccentricity image when the pixels are less than the per-pixel mean; and providing the object location prediction to a vehicle based on a location of the vehicle and the means for controlling vehicle steering, braking and powertrain.

20. The system of claim 19, further comprising determining TEDA data by means for processing the video data based to determine an eccentricity e image based on per pixel average and per pixel variance over a moving window of k video frames, wherein k is a small number.

* * * * *